United States Patent [19]

Perkins, Jr.

[11] 4,078,871
[45] Mar. 14, 1978

[54] SEA WAVE ENERGY CONVERSION

[76] Inventor: Clifford A. Perkins, Jr., 5851 Keokuk Ave., Woodland Hills, Calif. 91634

[21] Appl. No.: 608,510

[22] Filed: Aug. 28, 1975

Related U.S. Application Data

[63] Continuation-in-part of Ser. No. 468,926, Sep. 16, 1974, abandoned.

[51] Int. Cl.² ............................................. F04F 11/00
[52] U.S. Cl. ...................................... 417/100; 290/53; 60/398; 417/240
[58] Field of Search ................. 417/100, 240, 330, 92, 417/102, 103; 290/42, 43, 53, 54; 60/398

[56] References Cited

U.S. PATENT DOCUMENTS

| | | | |
|---|---|---|---|
| 430,790 | 6/1890 | Starkenberg | 417/240 |
| 655,541 | 8/1900 | Becker | 417/100 |
| 1,005,911 | 10/1911 | Wilbur | 417/100 |
| 1,061,110 | 5/1913 | Oliver et al. | 60/398 |
| 1,366,002 | 1/1921 | Hutchinson | 417/100 |
| 2,044,686 | 6/1936 | Harrison | 417/240 |
| 3,127,330 | 3/1964 | Katz | 417/100 |
| 3,149,776 | 9/1964 | Parrish | 417/100 |
| 3,685,291 | 8/1972 | Fadden | 417/100 |
| 4,013,379 | 3/1977 | Bolding | 417/100 |

*Primary Examiner*—Robert K. Schaefer
*Assistant Examiner*—John W. Redman

*Attorney, Agent, or Firm*—Frederick E. Mueller

[57] ABSTRACT

A fixed structure encloses a vertically spaced plurality of superimposed channels that are open at one end of the sea to receive deep sea waves approaching a shoreline. Each of the channels has an entrance ramp that slopes upwardly shorewardly to induce breaking of a wave at and over an apex of the ramp that merges into a shorewardly downwardly sloping convergent conduit having fluid communication with a pressure chamber of the structure through a one-way valve controlled aperture at which the wave energy is concentrated. A portion of each ramp is overlain by a roof which may comprise the underside of a superimposed ramp of another channel. Each of the ramps is of upwardly convex configuration, transversely to the wave direction, and at opposite sides is provided with re-entrant scuppers for draining backwash from a receding wave. Wave focusing vanes or walls diverge seawardly from the open end of the fixed structure along an axis bisecting a submerged transverse wall member embedded on the sea floor, of a lens configuration for bending and focusing a given linear wave length into the convergent walls. Water is directed from the pressure chamber of the structure into energy recovery devices utilizing the kinetic, hydrostatic and pneumatic energy contained in the pressure chamber, which acts as an accumulator.

19 Claims, 7 Drawing Figures

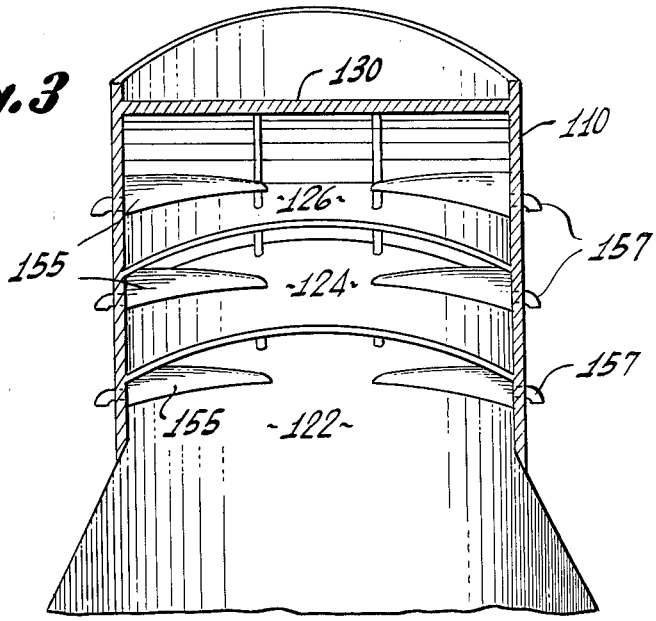
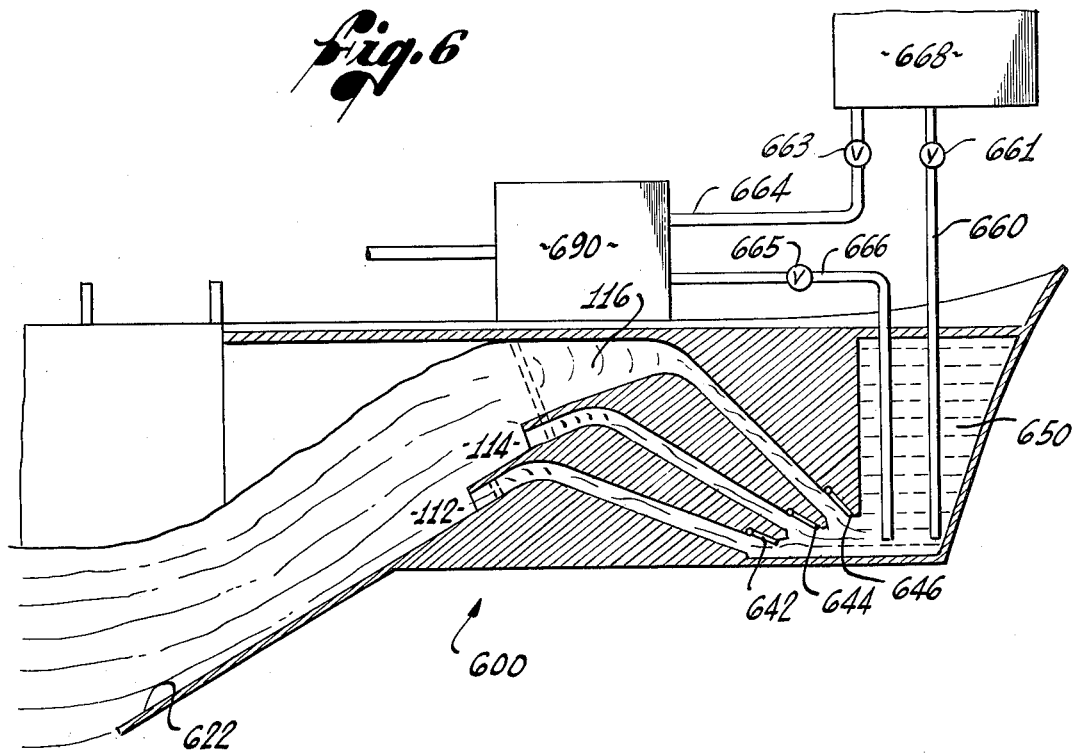

SEA WAVE ENERGY CONVERSION

This is a continuation-in-part of my application Ser. No. 468,926, filed Sept. 16, 1974 now abandoned.

BACKGROUND OF THE INVENTION

This invention relates to devices for exploiting the energy of sea waves. It relates more particularly to an apparatus through which seawater is pumped by an apparatus-induced breaking action of the waves.

The prior art is replete with attempts to recover a portion of the considerable energy otherwise expended by the sea in breaking upon the shore. These attempts were usually based on the conversion of the translational kinetic energy of the wave into hydrostatic head, for example, as in the patent to Blanks (U.S. Pat. No. 537,000) which mimics a blow hole sometimes found on rocky shores. Smith (U.S. Pat. No. 1,412,424) also describes a pump device, while Weems discloses an air compressor operated by wave impact (U.S. Pat. No. 755,728).

The devices of the prior art do not appear to have attained significant commercial success, perhaps because of an imperfect understanding of wave mechanics and because of their inability to adjust to and operate efficiently under varying conditions of tidal sea levels and wave heights.

Furthermore, the devices of the prior art do not disclose any means of preventing interaction between the backwash of a prior wave and the crest of a succeeding wave, the primary mechanism by which the energy of waves is destroyed on natural beaches.

The primary object of the present invention is to provide a wave energy convertor which is capable of efficiently utilizing incident wave kinetic energy at any combination of tidal level, wave heights and wave frequency. Another object of the invention is to provide a sea wave concentration surge pump having an integrated system of vanes, ramps, funnels and pressure chamber to concentrate large segments of deep water waves, convert them suddenly and precisely into surging breakers, and to direct into and contain the kinetic energy of a breaking wave in a pressure chamber trap for direct and indirect use on turbines, flywheels and other energy conversion mechanisms.

A further object of the invention is a convertor in which the backwash of an antecedent wave is largely prevented from interfering with the motion of a succeeding wave.

It is yet another object of the invention to provide a convertor system adapted to channel and focus the kinetic energy of the incoming wave, including the rotational energy thereof, to permit the optimum conversion of that energy to potential head.

Another object of the invention is a sea wave surge pump system adapted to feed prime movers, such as turbines, at a substantially constant rate with seawater impounded and pressurized in the apparatus.

SUMMARY OF THE INVENTION

The present invention attains the above objects, and other objects and advantages which shall become apparent from the detailed description of embodiments thereof, by means of a wave energy convertor including a plurality of superimposed sea wave surge pump channels.

These channels — suitably three in number — may be formed in a hull-like fixed structure at a shoreline with the axes of the channels oriented square to the prevailing direction of wave motion. Divergent vanes or sea walls extend seawardly to focus the incoming waves into the channels. Seawardly beyond the ends of the vanes a submerged wall-like lens is embedded on the sea floor, of a configuration to bend linear waves passing thereover for focusing a greater segment of wave length into the shorewardly convergent vanes for delivery into one or more of the sea wave surge pump channels.

Each of the channels of the fixed structure includes a shorewardly upwardly sloping intake ramp bounded by side walls of the hull-like fixed structure, although the lowermost ramp may be provided with an extension seawardly beyond the fixed structure, say to a depth of 50' beneath low tide level. Each of these ramps is upwardly convex, transversely to the prevailing direction of wave motion. Within the fixed structure portions of the intake ramps are partially overlain by the underside of a superimposed ramp or by a roof structure so that a wave or wave portion ascending an intake ramp is vertically confined to break at and over an apex of the ramp, the included air in the breaker cusp being forced into the system. A shorewardly downwardly sloping convergent conduit or funnel from each ramp receives the breaking wave for delivery through an exit opening into a pressure vessel. A non-return valve is mounted at the lowermost end of each of these funnel-like conduits to prevent reverse flow of impounded water from the pressure vessel to the sea.

Since the wave is a periodic phenomenon, an approaching trough will cause a reduction in the pressure exerted on the non-return valve and the latter will close, the balance of the wave mass receding towards the sea in a motion analogous to the backwash of a wave on the beach. To prevent this backwash from interfering with a crest of a following wave, scuppers are provided shorewardly of the leading edge of the intake ramp. These scuppers are closed toward the sea and open on the re-entrant side, being curved on the closed face to present minimal obstruction to the intake flow. Each scupper is provided with a discharge pipe passing through the side walls of the fixed structure. The upward convexity of the intake ramp aids in channeling the backwash laterally to the sides of the ramp and into the scuppers, providing for a rapid discharge of the reverse flow in such a manner that destructive impedance of the next wave crest is greatly reduced.

That portion of the wave mass pumped into the pressure vessel or chamber becomes available to perform useful work, for example, by being piped through a turbine whose discharge is at the prevailing mean sea level.

Because of the periodic nature of the wave action, it is preferred that an accumulator in the form of a closed elevated holding tank also be fed from the pressure vessel. Water stored in the tank becomes available to maintain a substantially uniform flow through the energy producing device.

A similar function is automatically provided by entrapped air carried with the inflow into the pressure chamber of the fixed structure. This air is at superatmospheric pressure, is present both in solution in the entrapped water and as an air cushion in the upper portion of the pressure chamber, and will act as the gas cushion of a hydraulic accumulator.

The wave energy convertor of the invention may be advantageously prefabricated in sizes and shapes analogous to the bow section of commercial sea going vessels or it may be adapted to construction on-site.

BRIEF DESCRIPTION OF THE DRAWINGS

FIG. 2-a is another schematic view, similar to FIG. 1, showing an alternative embodiment of funnel structure.

FIG. 3 is a schematic end elevational view from seaward, as indicated in FIG. 2.

FIG. 6 is a schematic longitudinal section of a wave energy convertor operating at a high mean tide level.

FIG. 1 shows a wave energy convertor 100 in plan view, partially sectioned to expose the uppermost of three wave surge pump channels. The apparatus is prefabricated inside a hull 110 corresponding in general shape and outline to the bow portion of a seagoing vessel with a substantially constant beam and draft. The hull 110 is open at its seaward end to the sea at a transverse plane 120 and the convertor 100 is held — by anchor, mooring lines, or partial embedment in a permanent, purpose built structure — in such an alignment that the rear face 120 is square to the predominant direction of a wave motion.

Figure 1:
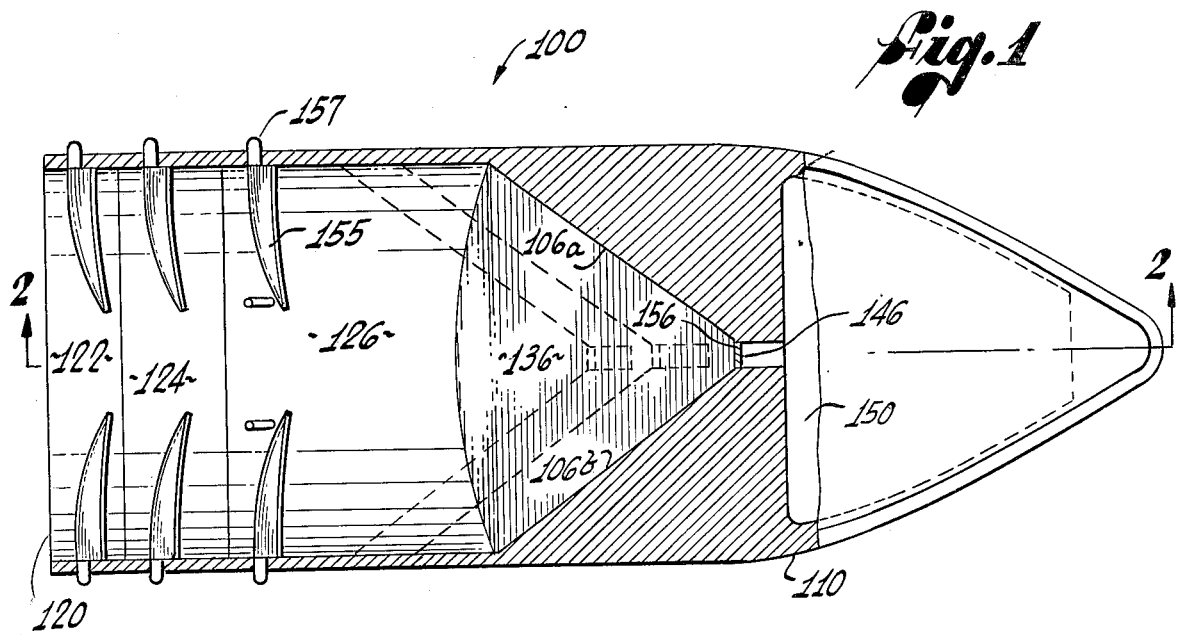
FIG. 1 is a schematic partial plan and sectional view, taken in the line 1—1 of FIG. 2, of a wave energy convertor in a prefabricated structure analogous to the bow portion of a ship.

Waves entering the convertor encounter upwardly sloping intake ramps 122, 124 and 126 that are vertically spaced in ascending elevational relationships with respect to one another. Preferably, the ramps 122, 124 and 126 have different slopes of about 45, 30 and 20 degrees, respectively, as viewed in FIG. 2, all of which will induce wave breaking. Within the hull 110 each of the intake ramps is bounded at opposite sides by the sidewalls of the hull structure although, as is shown in FIG. 3, the lowermost ramp 122 may be provided with a seaward extension beyond the hull structure, if the desired sea floor slope is not present naturally.

Because of the differences in elevation a wave entering the convertor 100 will initially fill an intake channel 112 defined by entrance ramp 122, the sidewalls of the hull and roof which is formed by the underside of ramp 124.

Larger waves, and/or small waves carried on a higher mean tide, will also enter the intermediate level of the convertor and an intake channel 114 defined by entrance ramp 124, side walls of the vessel and the lower surface of ramp 126.

Still larger waves, or waves superimposed on a high tide, will be captured in a channel 116 defined by entrance ramp 126, sidewalls of the hull 110, and by deck 130 of the hull 110.

Figure 2:
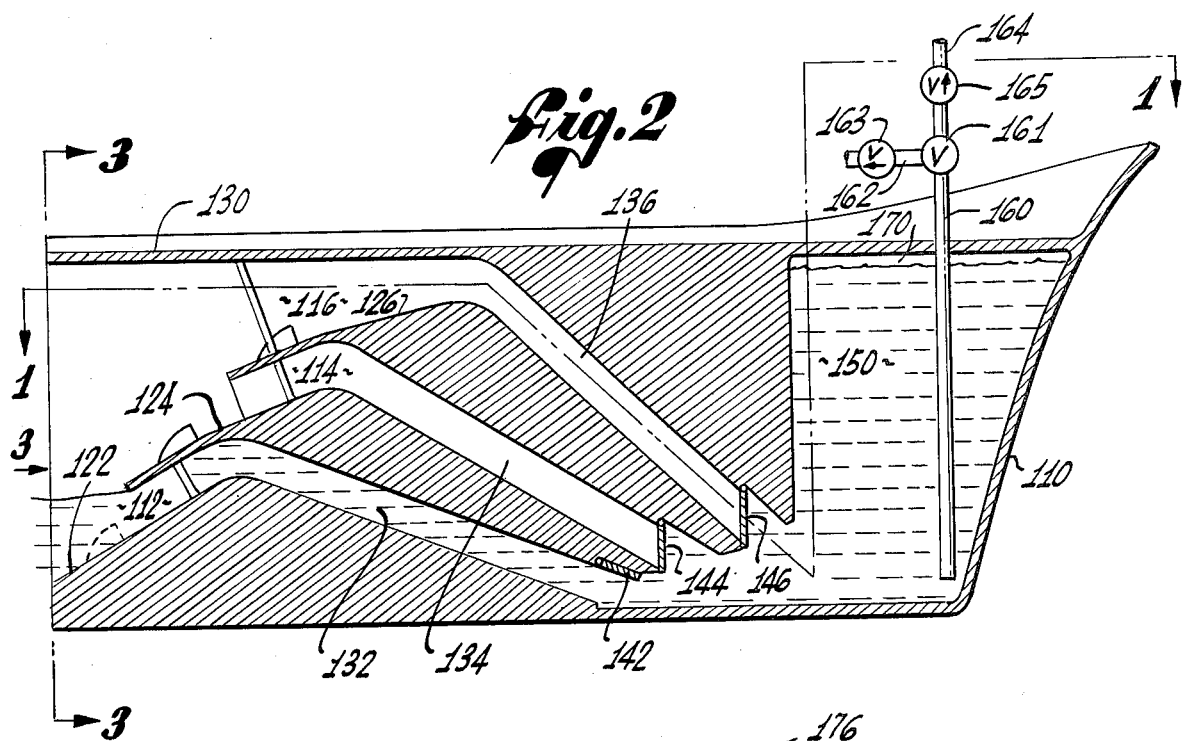
FIG. 2 is a longitudinal section taken on the line 2—2 of FIG. 1.

Each of the intake channels 112, 114 and 116 communicates with shorewardly downwardly convergent funnel-like conduits 132, 134 and 136 respectively. As is shown in FIG. 1, each of these funnel sections is formed with convergent vertical sidewalls, for example the sidewalls 106a and 106b, beyond the entrance ramp 126 which converge toward a throat 156 normally blocked by a valve flap 146. Similarly, the funnel sections for the intake channels 112 and 114 converge to throats normally blocked by valve flaps 142 and 144 respectively. As is indicated in FIG. 2, the upper and lower walls bounding these funnel sections may be essentially planar, as is indicated by the shading for the funnel section 136 of FIG. 1 and merge with upper and lower walls defining upper and lower boundaries of the respective intake channels 112, 114 and 116.

A wave or wave portion passing through the channel 116 will have its rotational kinetic energy increased due to the slope of the ramp 126, this slope being within the range of slopes to induce breaking of the wave at the apex of the ramp. The overhead roof for each of the ramps minimizes vertical energy loss in the breaking waves and air in the wave cusp is trapped and dissolved by compression to be pumped into pressure chamber 150. The mass of water in the breaking wave, having air entrapped in the cusp of the wave, is thus fed into the corresponding funnel section 136 in which it is accelerated by gravity and by the constriction of its forward flow passage area, with the total energy of the descending water mass impacting upon the valve flap 146. The valve flap is a simple non-return valve exposed on its inner face to the pressure prevailing in pressure chamber 150 located within the bounds of hull 110. Whenever the force exerted by the wave front exceeds the head in the chamber 150 the valve flap 146 opens and admits seawater to the pressure chamber. Flow will continue through the intake channel 116 over the apex of the ramp and through the convergent channel 136 until the crest of the breaking wave has passed and the momentum of the wave mass expended. As the wave slows and recedes the pressure exerted on the valve flap reduces to a value lower then the head in the pressure chamber 150, causing the valve flap to return to its normal position athwart the throat 156.

That portion of the wave mass which has not been admitted to the pressure chamber or retained in the funnel section begins to flow backward toward the open sea as the trough between the wave and its successor enters the wave energy convertor. This backwash is channeled towards the sidewalls by the upwardly convex curvature of the intake ramp 126 and is diverted outboard by scuppers 155 and conduits 157 mounted on the entrance ramps at either side of the hull 110.

The scuppers 155 are similar in shape and function on each of the entrance ramps, forming re-entrant open channels adapted to guide the backwash of a wave into conduits 157.

While the motion of a wave through the convertor 100 has been described in detail only with reference to its uppermost flow channel, the function of the lower channel and the intermediate channel, at corresponding tide levels, is in all respects identical. Flow may take place simultaneously in all three channels at high tides or in high seas at low tide. The provision of a plurality of superimposed flow channels of differently sloping ramps is to insure that at least one channel will be in a position to efficiently receive the flow of an incoming wave independent of the mean sea level, or of tidal condition, or the height and configuration of the wave.

The transverse sectional view of FIG. 2 shows the relative alignment of the three superimposed flow channels along the centerline of hull 110. The upwardly angled alignment of entrance ramps 122, 124 and 126 is clearly visible in the illustration as well as the downward trend of the funnel sections 132, 134 and 136 converging to valve flaps 142, 144 and 146.

FIG. 2 also clearly illustrates the arrangement of the pressure chamber 150 into which the focusing channels 132, 134 and 136 open. Pressurized seawater is stored in the chamber 150 and discharged for further use by conduit 160. A valve 161 is provided to direct the flow of water to an energy producing device, such as a turbine driven electrical generator, by a conduit 162 or toward an energy storing device, such as an elevated holding tank, by a conduit 164. Non-return valves 163 and 165 mounted in channels 162 and 164, respectively, prevent reverse flow at periods when the pressure level in chamber 150 might drop below the pre-existing condition, such as might occur upon a period of reduced wave activity.

One of the features of the wave energy convertor 100 is the utilization of air entrapped in the incoming seawater. Such air may remain in solution in the entrapped seawater of the chamber as well as taking the form of a charged air space 170 above the water surface in the pressure chamber 150. In either form, the entrapped heated and pressurized air functions as a hydraulic accumulator and tends to smooth the discharge by conduit 160, relative to the periodic flow into the chamber.

Figure 2A:
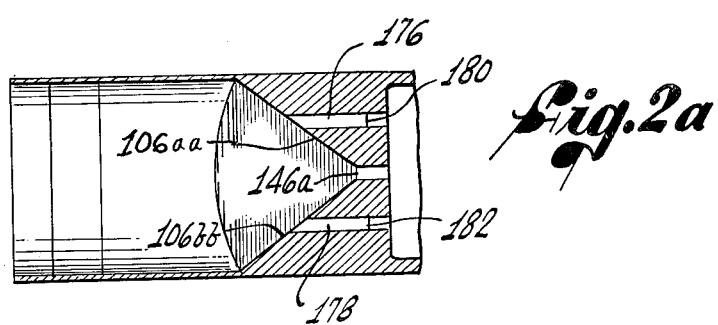

FIG. 2a illustrates a modification of the funnel section for increasing the volume of water displaced to the pressure chamber 150 from a wave. In this case, each of the flow channels is provided with a plurality of outlets from its corresponding convergent conduit or funnel section into the pressure chamber 150. For example, referring to the uppermost funnel section 136, its downstream end is closed by a non-return valve 146a located at the longitudinal axis of symmetry of the funnel section. Passages 176 and 178 are disposed on opposite sides of the axis of symmetry and extend longitudinally between convergent sidewalls 106aa and 106bb of the convergent section 136 and at their lowermost ends are closed by one-way valves 180 and 182.

Figure 4:
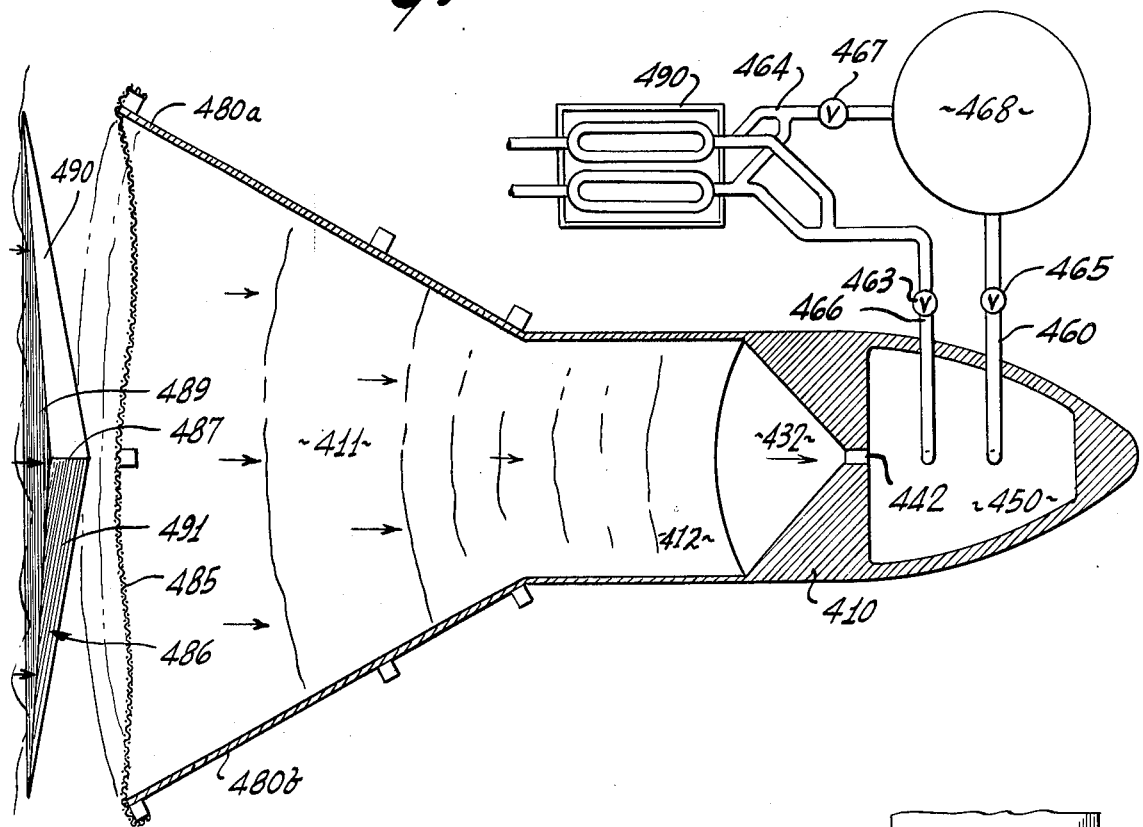
FIG. 4 is a schematic partly-sectioned plan view of another embodiment.

FIG. 4 is a schematic plan view of another embodiment of the invention, sectioned to expose the lowermost of a plurality of superimposed flow channels. The embodiment of FIG. 4 is adapted to be constructed on-site and is based on a concrete shell 410 dug into the contour of the natural shore.

Shorewardly convergent sea walls or vanes 480a and 480b define an aperture of, e.g., 45° to 50° leading into a focusing channel 411 open to incoming waves. A net 485 is stretched across the open end of the vanes to prevent the ingestion of marine animal life and floating debris by the wave energy recuperator. Seawardly of the net 485 a submerged wall 486 is embedded on the sea floor with its midpoint bisected by the longitudinal axis of the system, to provide a lens effect on incoming waves.

The wall 486 may be of a somewhat pyramidal configuration having an apex 487 defined by the junction of a seawardly facing and sloping flat wall 489 and a pair of sloping walls 490 and 491 on the shoreward side of the structure. It will be appreciated that this wall is massive and may be constructed of boulders or the like given a reinforced concrete facing for relative smoothness to avoid interference with the rotational kinetic energy of oncoming waves. An essentially linear wave approaching from the seaward side of the wall is bowed by the wall to induce shorewardly concave curvature whereby a greater length of wave segment will be fed into the focusing channel 411 than would otherwise be the case.

Waves entering the focusing channel 412 are refracted and laterally restricted and compressed increasing in height, volume and shoreward concavity as they progress down the channel, as indicated by the successive wave shapes depicted in FIG. 4, finally entering the open end of the shore based structure 410. Thereafter, a wave ascends the depicted shorewardly upsloping ramp 412 to break at and over its apex into convergent funnel section 432. The exit of the channel 432 leads, via non-return valve 442, into pressure chamber 450 constructed within the shell 410 and seawater pumped into the chamber 450 is discharged by a conduit 460 and 466 into a holding tank 468 and a turbine 490, respectively. Non-return valves 465 and 463 in the conduits 460 and 466 prevent return flow towards the pressure chamber. An additional conduit 464 supplies accumulated seawater from the holding tank 468 to the turbine 490 whenever the flow from the pressure chamber 450 is insufficient to drive the energy converting device. A non-return valve 467 in that line prevents non-productive circulatory flow in the hydraulic system.

Figure 5:
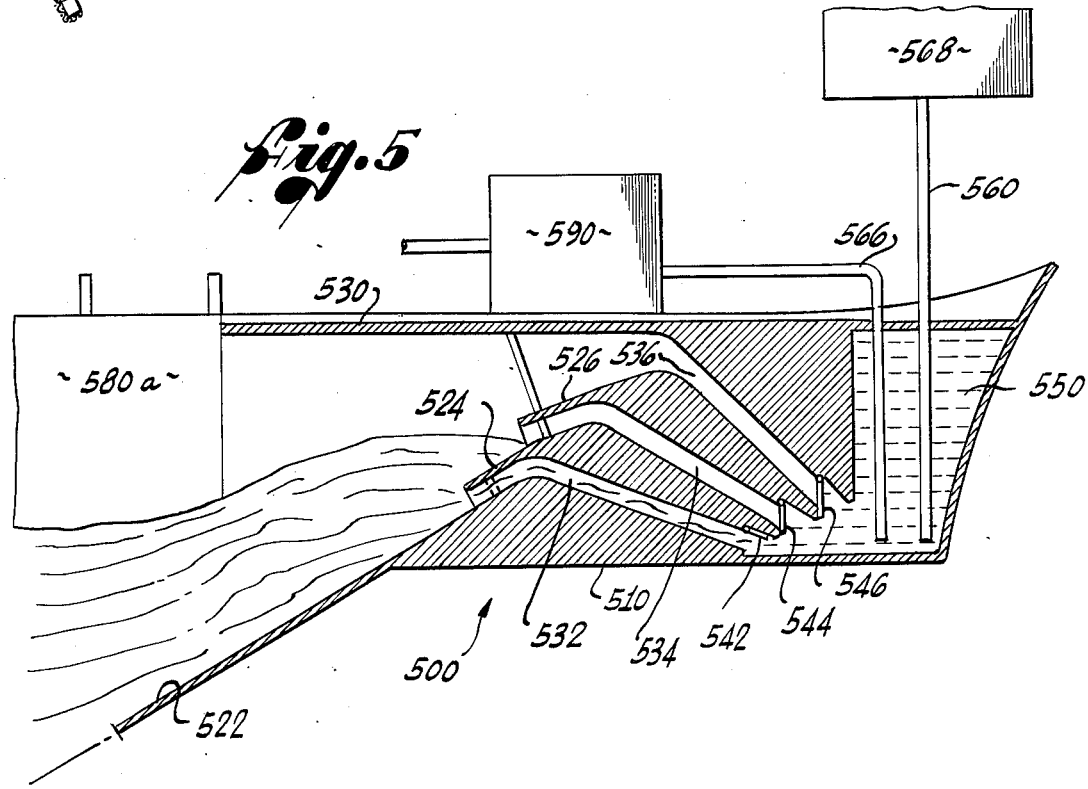
FIG. 5 is a schematic longitudinal section through a wave energy convertor operating at a low mean tide level.

The embodiment of FIG. 5 is similar to that of FIG. 4 except for a different arrangement of the external piping system. A fabricated shell 510 defines the external limits of the wave energy convertor 500, shown in longitudinal section. The convertor 500 is provided with three superimposed flow channels comprising, respectively, an intake ramp 522, further intake ramps 524, 526 and deck 530. Master intake ramp 522 differs from the analogous component 122 of FIG. 1 and is like that which would be employed in the plan of FIG. 4 in that it is extended for some distance seaward of the convertor 500 spanning the space intermediate between convergent vanes 580, to a depth of at least 50 feet below low tide level.

Seawater breaking over the apices of the intake ramps descends via convergent conduit sections 532, 534 and 536 into pressure chamber 550, as the one-way valves 542, 544 and 546 open and close. No external valving is provided in this embodiment of the invention; the closed holding tank 568 is an air cushioned accumulator and discharges into the energy convertor 590 through the pressure chamber 550.

Such a reduction of the number of moving components may improve the reliability of operation of the wave energy convertor. The non-return valves 542, 544 and 546 at the inner and lower ends of the funnel sections 532, 534 and 536 being the only necessary moving parts, their construction must be such as to insure the greatest possible freedom from malfunction and/or deterioration.

The longitudinal section of FIG. 6 shows a wave energy convertor 600 also adapted to construction in place. A wave is shown breaking over an extended ramp 622 forming the base of a flow channel 112; flow channels 114 and 116 are superimposed on the channel 112. These intake channels are equivalent to the corresponding components of convertor 100, merging into convergent conduits or funnel sections 132, 134 and 136. Non-return valve flaps 642, 644 and 646 are installed at the exits of the convergent channels, proximate to a pressure chamber 650 in which pressurized seawater pumped by wave action is transiently captured prior to flowing through a generator 690 and expending its energy. Excess water is held in tank 668 and the several components of the energy utilization and storage system are interconnected by conduits 660, 666 and 664 in which one-way valves 661, 665 and 663 prevent reverse flow.

It should be noted that in FIGS. 4, 5 and 6 the backwash guiding scuppers and discharge conduits — the equivalents of parts 155 and 157 in FIGS. 1–3 — have been omitted for the sake of clarity of illustration. These components are preferred for the efficient operation of the wave energy recuperator and form an integral part of each embodiment described herein.

The invention has been described above with reference to its preferred embodiment and variations thereof. Further variations in the method of construction, and the arrangement and construction of the backflow preventing valves therein, and other mechanical details, may occur to one skilled in the art. Such changes shall be deemed to be encompassed by the invention which is delimited only by the appended claims.

I claim:

1. A sea wave surge pump energy converter comprising:
   a structure having an open rear end to receive incoming waves;
   a forwardly upwardly sloping intake ramp longitudinally aligned with said open end to receive incoming waves and of a longitudinal slope to induce wave breaking at a horizontally disposed apex of said ramp,
   said ramp comprising part of an intake channel including opposite side walls of said structure to occlude a horizontal segment of an incoming wave therebetween;
   a forwardly downwardly convergent conduit in said structure comprising a rigidly integrated continuation of said ramp to receive occluded wave segments breaking over said apex for accellerated forward fall into a pressure vessel in said structure,
   a rear end of said conduit contiguous to said apex defining an opening of horizontally elongate configuration to receive the occluded wave segment,
   said convergent conduit comprising forwardly convergent lateral side walls for focusing the force of the breaking occluded wave segment upon a forward narrow inner end of said conduit;
   an enclosed pressure vessel in said structure in communication with said narrow end of said conduit to contain pressurized sea water received from said conduit;
   and a non-return valve at the forward end of said convergent conduit to check the escape from said pressure vessel of water pumped through said valve by sea waves breaking over said apex of said ramp.

2. An energy convertor as in claim 1 in which said ramp is of upwardly convex configuration, transversely to the direction of incoming waves.

3. An energy convertor as in claim 1 in which said ramp and said convergent conduit are symmetrical in plan-form about a longitudinal axis corresponding to incoming wave direction.

4. An energy convertor as in claim 1 in which said ramp slopes transversely to the incoming wave direction and has scupper means closed on the seaward face of said means and open to flow receding from the apex of said ramp, adapted to drain seawater entrained in said scupper means.

5. An energy convertor as in claim 1 that includes wave focusing vanes diverging seawardly from said structure and extending above sea level to laterally occlude an incoming wave segment as it approaches said ramp.

6. An energy convertor as in claim 1 that includes a submerged wall fixed on the sea floor at a location spaced seawardly from said structure,
   said submerged wall being disposed transversely to wave direction and having an upwardly convergent oppositely sloping profile, in elevation,
   said submerged wall being oriented, relative to the open end of said structure, to induce shoreward concavity in waves passing thereover, to increase the linear extent of waves directed into said open end of said structure.

7. An energy convertor as in claim 1 in which a rigid roof overhangs a portion of said ramp adjacent said apex and defines a conduit with said ramp and said opposite side walls of said structure,
   the underside of said roof being of a slope substantially conforming to the slope of said ramp, at least in the direction of incoming waves.

8. An energy convertor as in claim 7 having a plurality of superimposed sea wave surge pump channels each comprising a ramp, a convergent conduit and a non-return valve,
   the roof of lower ones of said ramps being defined by the underside of a ramp superimposed thereabove.

9. An energy convertor as in claim 1 having a plurality of superimposed sea wave surge pump channels each comprising a ramp, a convergent conduit and a non-return valve,
   each of said ramps having different upwardly forwardly slopes, the lowest ramp having the steepest slope.

10. An energy convertor as in claim 1 wherein said ramp is extended seaward beyond said structure to form an artifical beach.

11. The energy convertor of claim 1 wherein an elevated holding tank is provided, interconnected with said pressure chamber by a conduit.

12. The energy convertor of claim 11 wherein a further conduit interconnects said holding tank with the intake of a turbine and wherein non-return valves are provided in said conduit between said pressure chamber and said holding tank and in said further conduit to prevent reverse flow of seawater from said holding tank into said pressure chamber.

13. A sea wave-energy converter, comprising:
    a water tight hull open to the sea at a rear end thereof;
    a plurality of wave intake channels in said open end, in vertically superimposed relationship to one another, each one defined by:
    an upwardly forwardly sloping intake ramp,
    opposite side walls, and
    a roof;
    the apex of each of said channels being in communication with a downwardly forwardly sloping laterally convergent conduit comprising a longitudinal extension of the corresponding one of said channels;
    a non-return valve at the narrow forward downward end of each of said downwardly sloping conduits;
    a pressure chamber communicating with said narrow downward end of each of said downwardly sloping conduits;
    and means for conveying pressurized sea water pumped into said pressure chamber through said non-return valves to a device adapted to recover the potential energy thereof.

14. The wave-energy convertor of claim 13, wherein the roof of lower ones of said superimposed channels is formed by the underside of the intake ramp of the overlying channel, and the roof of the uppermost of said plurality of such channels is formed by the deck of said watertight hull.

15. The wave-energy convertor of claim 13, wherein said hull is constructed in the form of an open-ended prefabricated barge.

16. The wave-energy convertor of claim 13, wherein the upwardly sloping intake ramp of the lowermost of said plurality of channels is extended seaward to form an artifical beach.

17. The wave-energy convertor of claim 15, wherein said walls of said channels are also divergently extended seaward to form wave-refracting vanes.

18. The wave-energy convertor of claim 13, wherein an elevated holding tank is provided, interconnected with said pressure chamber by a conduit.

19. The wave-energy convertor of claim 18, wherein a further conduit interconnects said holding tank with the intake of a turbine, and wherein non-return valves are provided in said conduit between said pressure chamber and said holding tank, and in said further conduit, to prevent reverse flow of seawater from said holding tank into said pressure chamber.

* * * * *